United States Patent
Huebner

(10) Patent No.: US 9,945,407 B2
(45) Date of Patent: Apr. 17, 2018

(54) SYSTEM COMPOSED OF A SILL PANEL AND A FASTENING CLIP

(71) Applicant: ILLINOIS TOOL WORKS INC., Glenview, IL (US)

(72) Inventor: Manuel Huebner, Aub (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/305,672

(22) PCT Filed: Feb. 25, 2015

(86) PCT No.: PCT/US2015/017461
§ 371 (c)(1),
(2) Date: Oct. 21, 2016

(87) PCT Pub. No.: WO2015/167657
PCT Pub. Date: Nov. 5, 2015

(65) Prior Publication Data
US 2017/0045067 A1    Feb. 16, 2017

(30) Foreign Application Priority Data

Apr. 29, 2014   (DE) .................. 10 2014 105 973

(51) Int. Cl.
*B60K 37/00*   (2006.01)
*F16B 5/12*    (2006.01)
(Continued)

(52) U.S. Cl.
CPC .............. *F16B 5/128* (2013.01); *B60R 13/04* (2013.01); *B62D 25/025* (2013.01);
(Continued)

(58) Field of Classification Search
CPC ....... H01L 2924/0002; Y10T 24/44026; B60R 13/0206; B60R 13/04; F16B 21/075;
(Continued)

(56) References Cited

U.S. PATENT DOCUMENTS 4,874,200 A * 10/1989 Nasu ...................... B62D 23/00
                                                                  296/193.04
5,251,953 A * 10/1993 Willey ................... B60J 1/2002
                                                                  296/152
(Continued)

FOREIGN PATENT DOCUMENTS

DE        3540867 A1    6/1986
KR   1020140047285 A    4/2014

OTHER PUBLICATIONS

ISR and WO for PCT/US2015/017461 dated Jun. 8, 2015.

*Primary Examiner* — Kiran B Patel
(74) *Attorney, Agent, or Firm* — Hauptman Ham, LLP

(57) ABSTRACT

The invention relates to a system composed of a sill panel and a fastening clip for fastening the sill panel to a body part of a vehicle, wherein the sill panel has a latching hook, and wherein the fastening clip has a latching receptacle for receiving the latching hook and holding means for retention on the body part, wherein the latching receptacle also has an elastic holding arm which, with the latching hook of the sill panel received in the latching receptacle, exerts, on account of its spring preloading, a holding force on the latching hook which counteracts a release of the sill panel from the fastening clip, wherein, for demounting purposes, the sill panel can be released from the fastening clip by exerting a tensile force which counteracts the holding force of the elastic holding arm.

13 Claims, 2 Drawing Sheets

Figure 1:
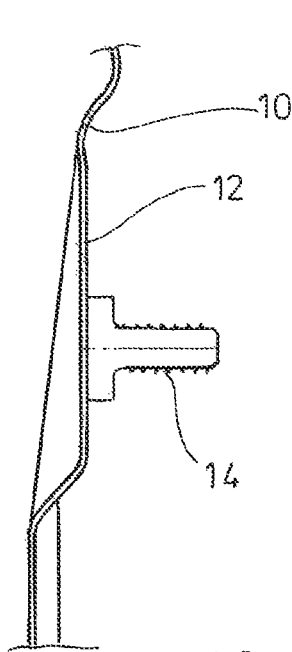

(51) Int. Cl.
  *B60R 13/04* (2006.01)
  *B62D 25/02* (2006.01)
  *B62D 27/06* (2006.01)
(52) U.S. Cl.
  CPC ............ *B62D 27/065* (2013.01); *F16B 5/123* (2013.01); *F16B 5/126* (2013.01); *B60R 2013/046* (2013.01)
(58) Field of Classification Search
  CPC . F16B 21/086; B62D 25/025; B62D 25/2018; B62D 25/20; B62D 25/2036
  See application file for complete search history.
(56) References Cited

U.S. PATENT DOCUMENTS

| | | | | |
|---|---|---|---|---|
| 6,102,473 A * | 8/2000 | Steininger | ........... | B60R 13/0206 296/209 |
| 2004/0244160 A1 * | 12/2004 | Nessel | ................... | F16B 5/0657 24/591.1 |
| 2005/0079009 A1 * | 4/2005 | Benedetti | ................ | F16B 5/123 403/329 |
| 2005/0241259 A1 * | 11/2005 | Rijsbergen | .............. | B60R 13/04 52/716.1 |
| 2006/0267381 A1 * | 11/2006 | Cave | ................... | B60R 13/0206 296/209 |
| 2007/0029842 A1 * | 2/2007 | Gade | ................. | B62D 25/2081 296/209 |
| 2012/0299329 A1 * | 11/2012 | Schidan | ................. | B60J 5/0408 296/146.7 |
| 2015/0233402 A1 * | 8/2015 | Hudson | ................. | B62D 27/02 24/456 |
| 2016/0257244 A1 * | 9/2016 | Oliverio | ................ | B60Q 1/323 |
| 2017/0066485 A1 * | 3/2017 | Yamaguchi | .......... | B62D 25/025 |

* cited by examiner

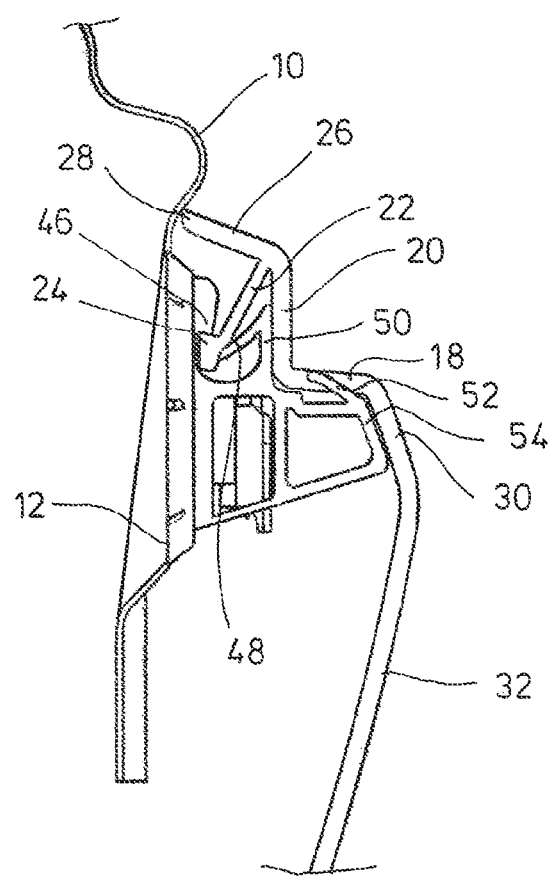
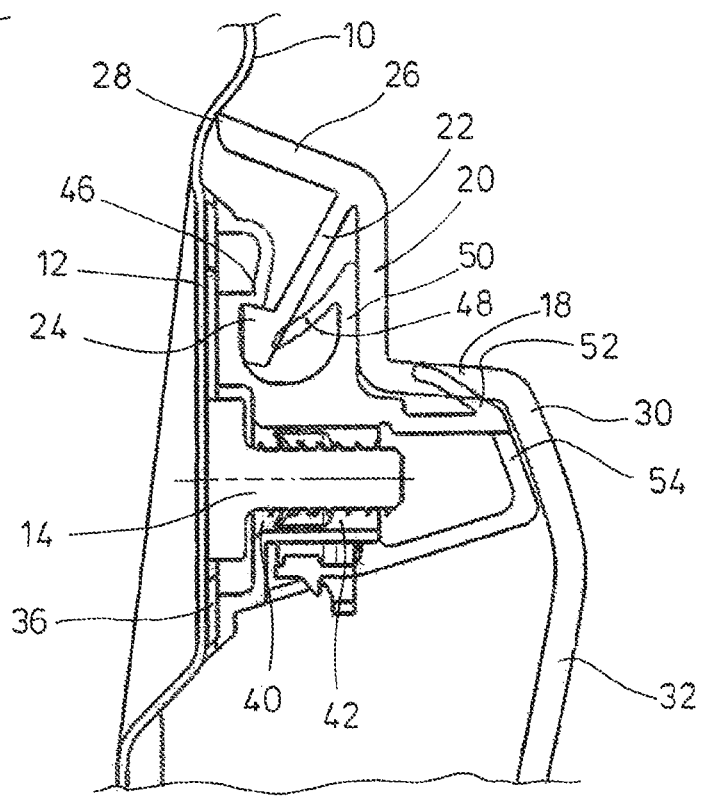

SYSTEM COMPOSED OF A SILL PANEL AND A FASTENING CLIP

RELATED APPLICATIONS

The present application is a National Phase of International Application Number PCT/US2015/017461, filed Feb. 25, 2015, and claims priority to German Application Number 10 2014 105 973.5, filed Apr. 29, 2014.

The invention relates to a system composed of a sill panel and a fastening clip for fastening the sill panel to a body part of a vehicle.

Sills are parts of the self-supporting body of a vehicle, in particular an automobile. The sills are situated longitudinally below the door entrance on both sides of the vehicle. For visual reasons, and also to provide protection, the sills are provided with a sill panel. In the prior art, for this purpose, a holding rail for example of metal or plastic is generally screwed to the respective sill. For this purpose, the holding rail must be held on the sill by means of a suitable holding device. The sill panel, which generally consists of plastic, is then suspended in the holding rail. The mounting operation and also a demounting operation which may be required are complicated, however.

Taking the explained prior art as the starting point, the object on which the invention is based is to provide a system of the type mentioned at the outset with which, combined with high holding forces in operation, the mounting and demounting of the sill panel is possible in a simple manner and with small mounting or demounting forces.

The invention achieves the object through the subject-matter of claim 1. Advantageous refinements can be found in the dependent claims, the description and the figures.

For a system of the type mentioned at the outset, the invention achieves the object in that the sill panel has a latching hook, and in that the fastening clip has a latching receptacle for receiving the latching hook and holding means for retention on the body part, wherein the latching receptacle also has an elastic holding arm which, with the latching hook of the sill panel received in the latching receptacle, exerts, on account of its spring preloading, a holding force on the latching hook which counteracts a release of the sill panel from the fastening clip, wherein, for demounting purposes, the sill panel can be released from the fastening clip by exerting a tensile force which counteracts the holding force of the elastic holding arm.

As already explained, the sill panel ("Rocker Panel") is fastened to a body part, in particular the sill, of a vehicle, in particular an automobile. As likewise already explained, sills are parts of the self-supporting vehicle body and are situated longitudinally below the door entrance on both sides of the vehicle between the front and rear wheelhouses.

According to the invention, fastening of the sill panel occurs by means of a fastening clip, in particular by means of a plurality of fastening clips, and not by screwing a carrier rail as in the prior art. The fastening clip has suitable holding means by which it is held on the body part, in particular the sill, which is to be provided with the sill panel. For fastening purposes, the sill panel has an in particular elastic latching hook and the fastening clip has a latching receptacle for receiving the latching hook in a releasably latching manner. With the latching hook of the sill panel received in the latching receptacle, an elastic holding arm of the latching receptacle exerts, on account of its spring preloading, a holding force on the latching hook and thus on the sill panel. This holding force counteracts a release of the sill panel from the fastening clip, in particular a release of the latching hook from the latching receptacle. As a result of in particular a manual exertion of a tensile force counteracting the holding force of the holding arm, the sill panel can be released from the fastening clip for demounting purposes. Demounting of the sill panel is achieved in particular by pivoting the sill panel, in particular upwardly, in the state in which it is fastened to the vehicle body. During demounting, the latching hook is released from the latching receptacle. According to the invention, the mounting and demounting operations are simplified by comparison with the prior art and possible with smaller forces. At the same time, high holding forces are achieved in the mounted state. Multiple mounting and demounting operations are also possible without damaging the fastening clip or the sill panel.

The system according to the invention comprises in particular a plurality of fastening clips formed according to the invention, wherein the sill panel is then fastened by the plurality of fastening clips to the body part of the vehicle in the manner according to the invention. The sill panel has an elongatedly extended shape. It can extend in particular along a straight line or a slight curvature. The parts of the sill panel required for fastening, in particular the latching hook, extend along the longitudinal direction of the sill panel. For fastening purposes, a plurality of fastening clips according to the invention are then fastened next to one another on the latching hook extending in the longitudinal direction of the sill. It is possible for the fastening clips to be premounted on the sill panel by latching the latching hook into the latching receptacles of the fastening dip. In this premounted state, the fastening clips can be mounted on the body part together with the sill panel held on said clips. However, it is also possible for the fastening clips to be mounted first of all on the body part and for the sill panel then to be latched with its latching hook on the fastening clips.

The sill panel is formed in one piece, for example from a plastic. The fastening clip is likewise formed in one piece, likewise preferably from a plastic. In principle, however, it can also consist of a metal material. The body part of the vehicle, in particular the sill, can consist of a metal material, preferably a steel or aluminum material. However, it is also conceivable for example for the body part to consist of plastic, in particular a fiber-reinforced plastic, such as CFP.

According to one refinement, it can be provided that the latching hook has a latching projection at its free end, and that the latching receptacle has a holding projection arranged opposite the elastic holding arm, wherein, on account of its spring preloading, the elastic holding arm presses the latching hook by its latching projection against the holding projection of the latching receptacle when the latching hook is received in the latching receptacle. The latching receptacle forms an undercut on which the latching hook latches.

The fastening clip can also have an elastic spring arm which, with the latching hook of the sill panel received in the latching receptacle, exerts, on account of its spring preloading, a holding force on the sill panel which counteracts a release of the sill panel from the fastening clip. The elastic spring arm exerts, in addition to the elastic holding arm, a holding force on the sill panel. During the demounting operation, a force which counteracts the holding force of the elastic spring arm and the holding force of the elastic holding arm is then exerted.

According to a further refinement, it can be provided that the fastening clip has a bearing portion by which the fastening clip bears against a bearing surface of the body part, wherein, with the latching hook received in the latching receptacle, the elastic spring arm of the fastening clip is supported on a first supporting portion of the sill panel that extends substantially perpendicularly to the bearing surface of the body part. The bearing portion of the fastening slip can be, for example, a bearing flange which delimits an inlet opening of a holding receptacle of the fastening clip. On account of the fact that the first supporting portion of the sill panel extends substantially perpendicularly to the bearing surface of the body part, a particularly high holding force of the sill panel on the fastening clip and thus on the body part is achieved.

According to a further refinement, it can be provided that the first supporting portion of the sill panel is adjoined by a second supporting portion extending substantially parallel to the bearing surface of the body part, the latching hook of the sill panel being arranged on the end of the second supporting portion that is remote from the first supporting portion. Furthermore, it can be provided that the elastic holding arm of the latching receptacle of the fastening clip is formed on the free end of a first carrier portion of the fastening clip, wherein, with the latching hook received in the latching receptacle, the first carrier portion is supported on the second supporting portion of the sill panel. Thus, in order to hold the latching hook in the latching receptacle, the first carrier portion and thus the holding arm are pressed onto the latching hook by the second supporting portion.

It can furthermore be provided that, starting from the end of the second supporting portion that is remote from the first supporting portion, there adjoins a third supporting portion of the sill panel which, with the latching hook received in the latching receptacle, is supported by its free end on the body part. The third supporting portion forms an abutment for demounting the sill panel. If the sill panel is pivoted for demounting purposes, the third supporting portion is pressed against the body part, with the result that in turn the latching hook is released from its latching engagement in the latching receptacle.

All or some of the supporting portions of the sill panel which are explained above or below can in particular in each case be situated in a substantially non-curved plane. The third supporting portion can extend at an obtuse angle with respect to the second supporting portion, preferably at an angle of greater than 100°. Furthermore, it can be provided that the latching hook of the sill panel extends at an angle of less than or equal to 90° with respect to the third supporting portion. Moreover, it can be provided that a fourth supporting portion extends starting from the end of the first supporting portion that is remote from the second supporting portion, wherein, with the latching hook of the sill panel received in the latching receptacle of the fastening clip, a second carrier portion of the fastening clip that carries the elastic spring arm is supported on the fourth supporting portion of the sill panel.

The holding means of the fastening clip for retention on the body part can comprise a holding receptacle for receiving, in particular releasably, a holding bolt arranged on the body part. For example, one or more latching elements can be provided in the holding receptacle for latching to the holding bolt. The holding bolt can, for example, be welded or adhesively bonded to the body part. The holding bolt can be a threaded bolt. The holding means, in particular the holding receptacle, and if appropriate latching elements provided therein, serve for releasably fastening the fastening clip to the body part. For example, the design of the latching elements in the latching receptacle can be such that the fastening clip can be unscrewed from the holding bolt for demounting purposes. The latching elements can, for example, be latching legs which releasably latch to a thread or a latching receptacle of the holding bolt. Alternatively, it is also conceivable for the holding means of the fastening clip to comprise an adhesive by which the fastening clip is adhesively bonded to the surface of the body part, in particular with its bearing portion on the bearing surface of the body part. Adhesive bonding is conceivable, for example, in the case of plastic bodies. According to a further alternative, it is also possible for the holding means of the fastening clip to comprise one or more latching elements by which the fastening clip can be latched to an opening in the body part.

The system according to the invention can also comprise the body part, in particular a sill, which is to be provided with the sill panel, if appropriate with holding bolts arranged on said sill.

Figure 2:
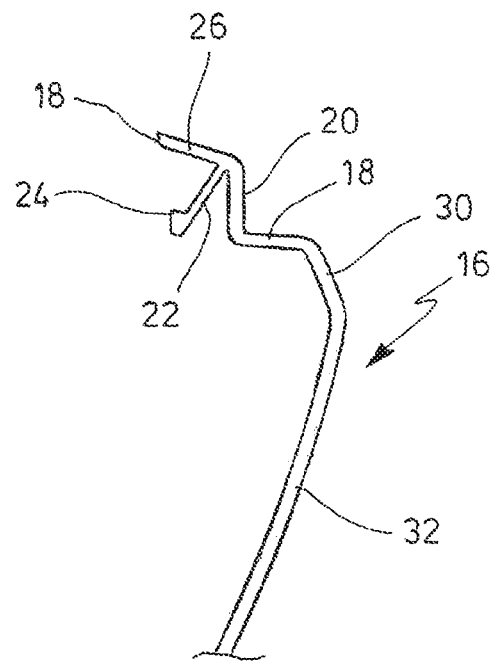
Figure 3:
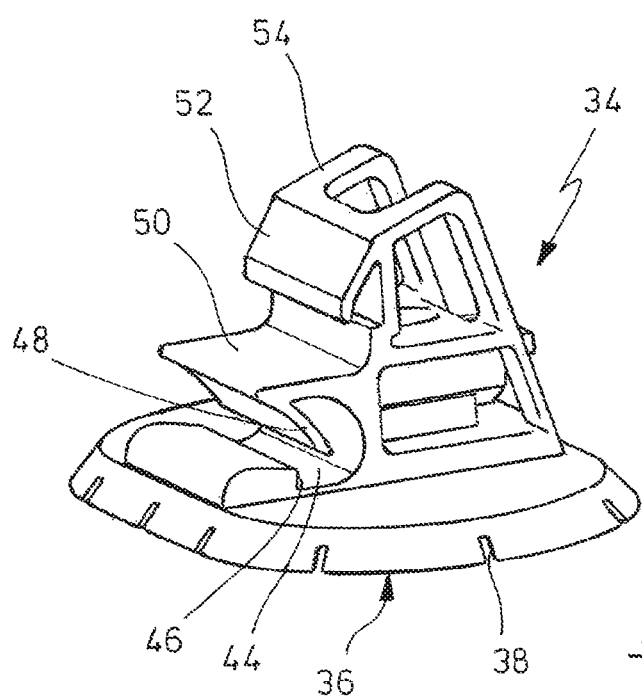

An exemplary embodiment of the invention will be explained in more detail below with reference to schematically illustrated figures, in which:

FIG. 1 shows a body part to be provided with a sill panel in a sectional view,

FIG. 2 shows a sill panel of a system according to the invention that is to be fastened to the body part shown in FIG. 1 in a sectional view, FIG. 3 shows a fastening clip of the system according to the invention that is used for fastening the sill panel shown in FIG. 2 to the body part shown in figure in a perspective view, FIG. 4 shows the sill panel shown in FIG. 2 in a state in which it is mounted by means of the fastening clip shown in FIG. 3 to the body part shown in FIG. 1 in a side view, and FIG. 5 shows an enlarged detail sectional view of the illustration from FIG. 4.

A body part 10, in the present case a sill 10, of an automobile is shown in FIG. 1 in a sectional view. The sill 10 consists, for example, of a metal material, such as aluminum or steel. The sill 10 has a bearing surface 12 on which a holding bolt 14, in the present case a threaded bolt 14, is provided, for example welded to the bearing surface 12. FIG. 2 shows a sill panel 16, for example of plastic. Both the sill panel 16 in FIG. 2 and the sill 10 in FIG. 1 extend along a longitudinal direction, into the plane of the drawing in FIGS. 1 and 2. Here, a plurality of holding bolts 14 uniformly spaced apart one behind the other in the longitudinal direction are arranged on the bearing surface 12 of the sill 10, of which only one holding bolt can be seen in FIG. 1. The sill panel 16 shown in FIG. 2 has a first supporting portion 18 which, in the mounted state of the sill panel 16, extends substantially perpendicularly to the bearing surface 12 of the sill 10. The first supporting portion 18 is adjoined on one side by a second supporting portion 20 which, in the mounted state, extends substantially parallel to the bearing surface 12 of the sill 10, an elastic latching hook 22 being arranged at the end of the second supporting portion 20 that is remote from the first supporting portion 18. The latching hook 22 extends in the longitudinal direction of the sill panel 16, into the plane of the drawing in FIG. 2. The latching hook 22 has a latching projection 24 at its free end. Furthermore, the end of the second supporting portion 20 that is remote from the first supporting portion 18 is adjoined by a third supporting portion 26 of the sill panel 16 with a free end 28. On the side remote from the second supporting portion 20, the first supporting portion 18 is further adjoined by a fourth supporting portion 30 which leads into a covering portion 32 of the sill panel 16. As can be seen in FIG. 2, the third supporting portion 26 extends with respect to the second supporting portion 20 at an angle of greater than 100°. The latching hook 22 of the sill panel 16 extends with respect to the third supporting portion 26 at an angle of less than 90°.

FIG. 3 shows a fastening clip 34. The system according to the invention has a plurality of the fastening clips shown in FIG. 3. These fastening clips are used to fasten the sill panel to the sill 10, as will be further explained below. The design of the fastening clips 34 is identical, this being explained below by way of the fastening clip 34 shown in FIG. 3. The fastening clip 34 has a bearing portion 36, in the present case a bearing flange 36, which is provided over its periphery with a plurality of slots 38. As a result, the flange portions situated between the slots 38 are slightly resiliently elastic. The bearing portion 36 at the same time forms an inlet opening of a holding receptacle 40 of the fastening clip, which can be seen in particular in FIG. 5. A plurality of elastic latching legs 42 project into the holding receptacle 40, with the result that the fastening clip 34 can be pressed with its holding receptacle 40 onto the holding bolt 14 of the sill 10 while the elastic latching legs 42 latch to the external thread of the holding bolt 14, as can be seen in principle in the sectional view in FIG. 5. When mounting the fastening clip 34 on the holding bolt 14, the bearing portion 36 comes to bear on the bearing surface 12 while the elastic portions between the slots 38 spread slightly apart. In this way, the fastening bolt 34 is releasably fastened to the holding bolt 14. For demounting purposes, the fastening clip 34 can be unscrewed from the holding bolt 14.

Moreover, the fastening clip 34 has a latching receptacle 44 in which the latching hook 24 of the sill panel 16 can be received in a releasably latching manner. For this purpose, the latching receptacle 44 has a holding projection 46 and an elastic holding aim 48 arranged opposite the holding projection 46. The elastic holding arm 48 is formed on the free end of a first carrier portion 50 of the fastening clip 34. In addition, the fastening clip 34 has an elastic spring arm 52 which is arranged on a second carrier portion 54 of the fastening clip 34.

The fastening of the sill panel 16 to the sill 10 by means of the fastening clip 34 will be explained by way of FIGS. 4 and 5. As can be seen in FIGS. 4 and 5, the fastening clips 34 are fastened in a latching manner to the holding bolts 14 of the sill 10 in the manner explained above. The sill panel 16 is received by its latching hook 22 in a latching manner in the latching receptacle 44 of the fastening clip 34, wherein the latching projection 24 of the latching hook 22 comes to bear on the holding projection 46 of the latching receptacle 44. At the same time, the elastic holding arm 48 is deflected from its rest position by the latching hook 22 inserted into the latching receptacle 44, with the result that the elastic holding arm 48 then exerts, on account of its spring preloading, a holding force on the latching hook 22 which holds the latching hook 22 in the latching receptacle 44. Moreover, it can be seen in FIGS. 4 and 5 that the elastic spring arm 52 of the fastening clip 34 is supported on the first supporting portion 18 of the sill panel 16. It should be noted that, for reasons of clarity, FIGS. 4 and 5 show the elastic spring arm 52 protruding into the first supporting portion 18. Of course, the elastic spring arm 52 is supported on the first supporting portion 18 with deformation from its rest position, with the result that, owing to the geometry of the sill panel 16, in particular its supporting portions 18, 20, 26, a holding force is also exerted on the sill panel 16 by the elastic spring arm 52, this holding force holding the sill panel 16 in the position in which it is latched to the fastening clip 34. In this arrangement, the first carrier portion 50 carrying the elastic holding arm 48 of the latching receptacle 44 is supported on the second supporting portion 20 of the sill panel 16. In addition, it can be seen that the third supporting portion 26 is supported by its free end 28 on the sill 10.

In the state shown in FIGS. 4 and 5, the sill panel 16 is securely held with a high holding force on the sill 10 by the fastening clips 34. Mounting can take place manually with small mounting forces. For demounting purposes, the sill panel 16 can likewise be pivoted manually with a small demounting force in the counterclockwise direction in FIGS. 4 and 5, with it being necessary, in particular, to overcome the holding forces of the elastic holding arm 48 of the latching receptacle 44 and those of the elastic spring arm 52. This causes the latching connection of the latching hook 22 in the latching receptacle 44 to be released, with the result that the sill panel 16 can then be removed from the fastening clip 34.

The invention claimed is:

1. A system composed of a sill panel and a fastening clip for fastening the sill panel to a body part of a vehicle, wherein the sill panel has a latching hook, and in that the fastening clip has a latching receptacle for receiving the latching hook and holding means for retention on the body part, wherein the latching receptacle also has an elastic holding arm which, with the latching hook of the sill panel received in the latching receptacle, exerts, on account of its spring preloading, a holding force on the latching hook which counteracts a release of the sill panel from the fastening clip, wherein, for demounting purposes, the sill panel can be released from the fastening clip by exerting a tensile force which counteracts the holding force of the elastic holding arm.

2. The system as claimed in claim 1, wherein the latching hook has a latching projection at its free end, and in that the latching receptacle has a holding projection arranged opposite the elastic holding arm, wherein, on account of its spring preloading, the elastic holding arm presses the latching hook by its latching projection against the holding projection of the latching receptacle when the latching hook is received in the latching receptacle.

3. The system as claimed in claim 1, wherein the fastening clip also has an elastic spring arm which, with the latching hook of the sill panel received in the latching receptacle, exerts, on account of its spring preloading, a holding force on the sill panel which counteracts a release of the sill panel from the fastening clip.

4. The system as claimed in claim 3, wherein the fastening clip has a bearing portion by which the fastening clip bears against a bearing surface of the body part, wherein, with the latching hook received in the latching receptacle, the elastic spring arm of the fastening clip is supported on a first supporting portion of the sill panel that extends substantially perpendicularly to the bearing surface of the body part.

5. The system as claimed in claim 4, wherein the first supporting portion of the sill panel is adjoined by a second supporting portion extending substantially parallel to the bearing surface of the body part, the latching hook of the sill panel being arranged on the end of the second supporting portion that is remote from the first supporting portion.

6. The system as claimed in claim 5, wherein the elastic holding arm of the latching receptacle of the fastening clip is formed on the free end of a first carrier portion of the fastening clip, wherein, with the latching hook received in the latching receptacle, the first carrier portion is supported on the second supporting portion of the sill panel.

7. The system as claimed in claim 5, wherein, starting from the end of the second supporting portion that is remote from the first supporting portion, there adjoins a third supporting portion of the sill panel which, with the latching hook received in the latching receptacle, is supported by its free end on the body part.

8. The system as claimed in claim 7, wherein the third supporting portion extends at an obtuse angle with respect to the second supporting portion, preferably at an angle of greater than 100°.

9. The system as claimed in claim 7, wherein the latching hook of the sill panel extends at an angle of less than or equal to 90° with respect to the third supporting portion.

10. The system as claimed in claim 5, wherein a fourth supporting portion extends starting from the end of the first supporting portion that is remote from the second supporting portion, wherein, with the latching hook of the fastening clip, a second carrier portion of the fastening clip that carries the elastic spring arm is supported on the fourth supporting portion of the sill panel.

11. The system as claimed in claim 1, wherein the holding means of the fastening clip for retention on the body part comprise a holding receptacle for receiving a holding bolt arranged on the body part.

12. The system as claimed in claim 11, wherein one or more latching elements are provided in the holding receptacle for latching to the holding bolt.

13. The system as claimed in claim 1, wherein it also comprises the body part.

\* \* \* \* \*